(12) United States Patent
Zheng

(10) Patent No.: US 11,256,905 B2
(45) Date of Patent: Feb. 22, 2022

(54) FACE DETECTION METHOD AND APPARATUS, SERVICE PROCESSING METHOD, TERMINAL DEVICE, AND STORAGE MEDIUM

(71) Applicant: Tencent Technology (Shenzhen) Company Limited, Guangdong (CN)

(72) Inventor: Kesong Zheng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/032,370

(22) Filed: Sep. 25, 2020

(65) Prior Publication Data

US 2021/0019503 A1    Jan. 21, 2021

Related U.S. Application Data

(63) Continuation of application No. PCT/CN2019/108145, filed on Sep. 26, 2019.

(30) Foreign Application Priority Data

Sep. 30, 2018 (CN) .......................... 201811165758.5

(51) Int. Cl.
*G06K 9/00* (2006.01)
*G06K 9/62* (2022.01)

(52) U.S. Cl.
CPC ..... *G06K 9/00281* (2013.01); *G06K 9/00248* (2013.01); *G06K 9/627* (2013.01); *G06K 9/6256* (2013.01)

(58) Field of Classification Search
CPC ........... G06K 9/00281; G06K 9/00248; G06K 9/6256
See application file for complete search history.

(56) References Cited

U.S. PATENT DOCUMENTS 8,165,354 B1    4/2012  Zhao
2008/0037836 A1*  2/2008  Chen ................ G06K 9/00281
                                                                   382/118

(Continued)

FOREIGN PATENT DOCUMENTS

CN    104598936 A    5/2015
CN    105912990 A    8/2016

(Continued)

OTHER PUBLICATIONS

International Search Report and Written Opinion dated Dec. 27, 2019 in International Application No. PCT/CN2019/108145, (6 pages).

(Continued)

*Primary Examiner* — Md K Talukder
(74) *Attorney, Agent, or Firm* — Oblon, McClelland, Maier & Neustadt, L.L.P.

(57) ABSTRACT

Embodiments of this application disclose a face detection method and apparatus, a service processing method, a terminal device, and a storage medium. The method can include obtaining a to-be-detected target facial image, and performing a hierarchical fitting training by using a face alignment algorithm and a sample data set to obtain a target face alignment model. Further, the method can include invoking the target face alignment model to perform a face alignment detection on the target facial image, to obtain a target key point set of the target facial image, and determining a feature area of the target facial image according to the target key point set.

19 Claims, 9 Drawing Sheets

(56) References Cited

U.S. PATENT DOCUMENTS

| | | | |
|---|---|---|---|
| 2017/0161551 A1 | 6/2017 | Wang et al. | |
| 2018/0137383 A1* | 5/2018 | Yao | G06K 9/00248 |
| 2019/0122404 A1* | 4/2019 | Freeman | G06T 7/251 |
| 2019/0251337 A1* | 8/2019 | Liang | G06K 9/00248 |
| 2020/0042769 A1* | 2/2020 | Yan | G06K 9/00248 |
| 2021/0019503 A1* | 1/2021 | Zheng | G06K 9/6256 |

FOREIGN PATENT DOCUMENTS

| | | | |
|---|---|---|---|
| CN | 106203395 A | 12/2016 | |
| CN | 106407958 A | 2/2017 | |
| CN | 107146196 A | 9/2017 | |
| CN | 107463865 A | 12/2017 | |
| CN | 107886064 A | 4/2018 | |
| CN | 108073873 A | 5/2018 | |
| CN | 108121952 A | 6/2018 | |
| CN | 108446606 A | 8/2018 | |
| CN | 108550176 A | 9/2018 | |
| CN | 109359575 A | 2/2019 | |

OTHER PUBLICATIONS

Written Opinion dated Dec. 27, 2019 in International Application No. PCT/CN2019/108145. (4 pages).

Office Action issued in corresponding Chinese Patent Application No. 2018111657585 dated Jul. 21, 2021 (with English translation) 38 pages.

Yao Feng et al., "Joint 3D Face Reconstruction and Dense alignment with Position Map Regression Network", European Conference on Computer Vision (ECCV) 2018,<arXiv:1803.07835 v1>, Mar. 21, 2018, pp. 1-18, 18 pages.

Wen-Chao Du et al., "Face Alignment based on Local Shapes Constraint Network" Journal of Sichuan University (Natural Science Edition), vol. 54, No. 5. Sep. 30, 2017, pp. 953-958-15 (with English abstract) (6 pages).

Office Action issued in corresponding European Patent Application No. 19864907.1-1207/3754541 dated Aug. 5, 2021. (with English translation) 12p.

Feng Tang, et al., "Probabilistic Hierarchical Face Model for Feature Localization", IEEE Workshop on Applications of Computer Vision (WACV'07) 978-0-7695-2794-9, 2007, 4 pages.

\* cited by examiner

FACE DETECTION METHOD AND APPARATUS, SERVICE PROCESSING METHOD, TERMINAL DEVICE, AND STORAGE MEDIUM

RELATED APPLICATION

This application is a continuation of International Application No. PCT/CN2019/108145, filed on Sep. 26, 2019, which claims priority to Chinese Patent Application No. 201811165758.5, entitled "FACE DETECTION METHOD, SERVICE PROCESSING METHOD, APPARATUS, TERMINAL, AND MEDIUM" and filed on Sep. 30, 2018. The entire disclosures of the prior applications are hereby incorporated by reference in their entirety.

FIELD OF THE TECHNOLOGY

This application relates to the field of image processing technologies, including a face detection method and apparatus, a service processing method, a terminal device, and a storage medium.

BACKGROUND OF THE DISCLOSURE

Image processing is a technology that uses a computer to process an image to achieve a desired result. In the field of image processing, face detection can be important, and the face detection may include a face alignment detection. The so-called face alignment detection may also be referred to as a face key point detection, in which a facial image is detected to locate key feature points of the face, for example, the eyes, the nose, and the corners of the mouth.

SUMMARY

Embodiments of this application provide a face detection method and apparatus, a service processing method, a terminal device, and a storage medium, to better perform a face detection on a facial image, thereby improving the accuracy of a detection result.

According to an aspect, the disclosure provides a face detection method that can be performed by a terminal device. The method can include obtaining a to-be-detected target facial image, and performing a hierarchical fitting training by using a face alignment algorithm and a sample data set to obtain a target face alignment model. The method can further include invoking the target face alignment model to perform a face alignment detection on the target facial image, to obtain a target key point set of the target facial image, and determining a feature area of the target facial image according to the target key point set.

According to another aspect, an embodiment of this disclosure provides a service processing method that is performed by a terminal device. The method can include invoking, in a case that a service request requiring a face alignment detection is detected, a camera apparatus of the terminal device to obtain a target facial image of a requester, and performing the face alignment detection on the target facial image by using a face detection method to obtain a feature area of the target facial image. The method can further include processing a requested service according to the feature area of the target facial image to respond to the service request.

According to still another aspect, an embodiment of this disclosure provides a face detection apparatus. The apparatus can include processing circuitry that is configured to obtain a to-be-detected target facial image, and perform a hierarchical fitting training by using a face alignment algorithm and a sample data set to obtain a target face alignment model. The processing circuitry can be further configured to invoke the target face alignment model to perform a face alignment detection on the target facial image, to obtain a target key point set of the target facial image, and to determine a feature area of the target facial image according to the target key point set.

In a further embodiment of this application, a terminal device can be provided that includes a processor, an input device, an output device, and a memory, where the processor, the input device, the output device, and the memory can be connected to each other. Further, the memory can be configured to store a computer program including a first program instruction. The processor can be configured to invoke the first program instruction to perform the face detection method. Alternatively, the computer program can include a second program instruction, where the processor can be configured to invoke the second program instruction to perform the service processing method.

According to still another aspect, an embodiment of this application provides a non-transitory computer storage medium, the computer storage medium storing a first computer program instruction. The first computer program instruction, when executed, can implement the foregoing face detection method. Alternatively, the computer storage medium storing a second computer program instruction, where the second computer program instruction, when executed, can implement the foregoing service processing method.

BRIEF DESCRIPTION OF THE DRAWINGS

To describe the technical solutions of the embodiments of this application or the related art more clearly, the following briefly describes the accompanying drawings required for describing the exemplary embodiments or the related art. The accompanying drawings in the following description show only some embodiments of this application, and a person skilled in the art may still derive other drawings from the accompanying drawings.

DESCRIPTION OF EMBODIMENTS

The following clearly and completely describes the technical solutions in the embodiments of this application with reference to the accompanying drawings in the embodiments of this application.

A face key point (a key point for short), also referred to as a facial feature point, usually includes points that constitute facial features (the eyebrows, eyes, nose, mouth, and ears) and a facial profile. A method for detecting a facial image and labeling one or more key points in the facial image may be referred to as a face key point detection method or a face alignment detection method. Feature areas in the facial image may be determined by performing a face alignment detection on the facial image. The feature areas herein may include, but are not limited to, an eyebrow area, an eye area, a nose area, a mouth area, and an ear area.

In an embodiment of this application, a target face alignment model (which may also be referred to as a target face key point detection model) may be provided to implement the face alignment detection. After a to-be-detected target facial image is obtained, the target face alignment model may be invoked to perform the face alignment detection on the target facial image, to determine a plurality of key points and label information of the key points in the target facial image. The key points herein may include, but are not limited to, mouth key points, eyebrow key points, eye key points, nose key points, and ear key points. The label information of the key points may include, but is not limited to, position information (for example, labeling positions of the key points), shape information (for example, being labeled as a dot shape), and feature information. The feature information is used for representing categories of the key points. For example, if the feature information is feature information of eyes, it represents that the key points are the key points of the eyes. In another example, if the feature information is feature information of the nose, it represents that the key points are the key points of the nose.

Figure 1A:
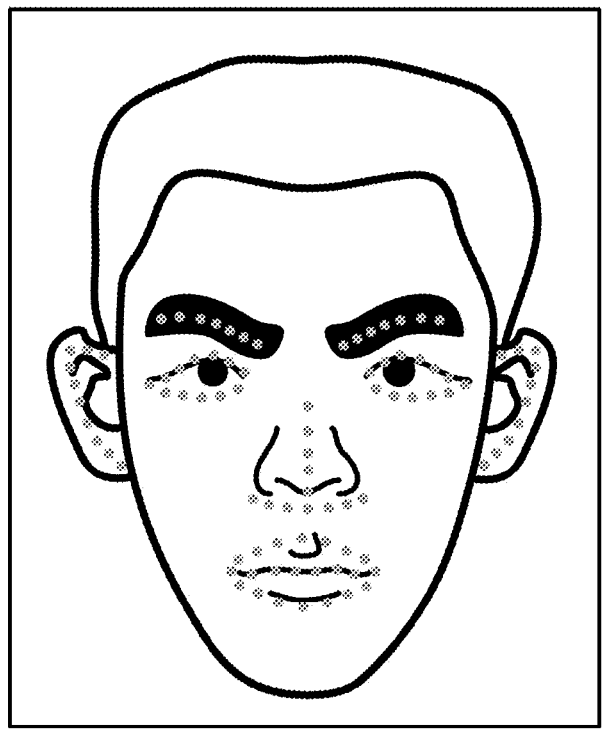
FIG. 1a is a schematic diagram of a target facial image according to an embodiment of this application.
Figure 1B:
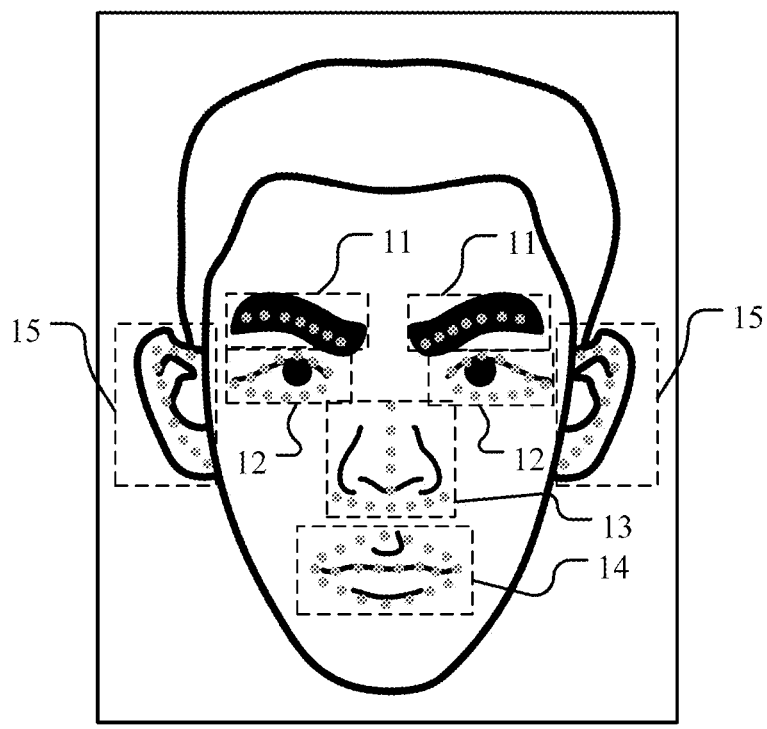
FIG. 1b is a schematic diagram of another target facial image according to an embodiment of this application.

The plurality of key points determined in the target facial image may be shown as gray dots in FIG. 1*a*. After the plurality of key points are determined, feature areas of the target facial image may be determined based on the label information of the key points. For example, according to labeled positions of gray spots in FIG. 1*a*, an eyebrow area 11, an eye area 12, a nose area 13, a mouth area 14, and an ear area 15 may be separately determined, as shown in FIG. 1*b*.

Figure 2:
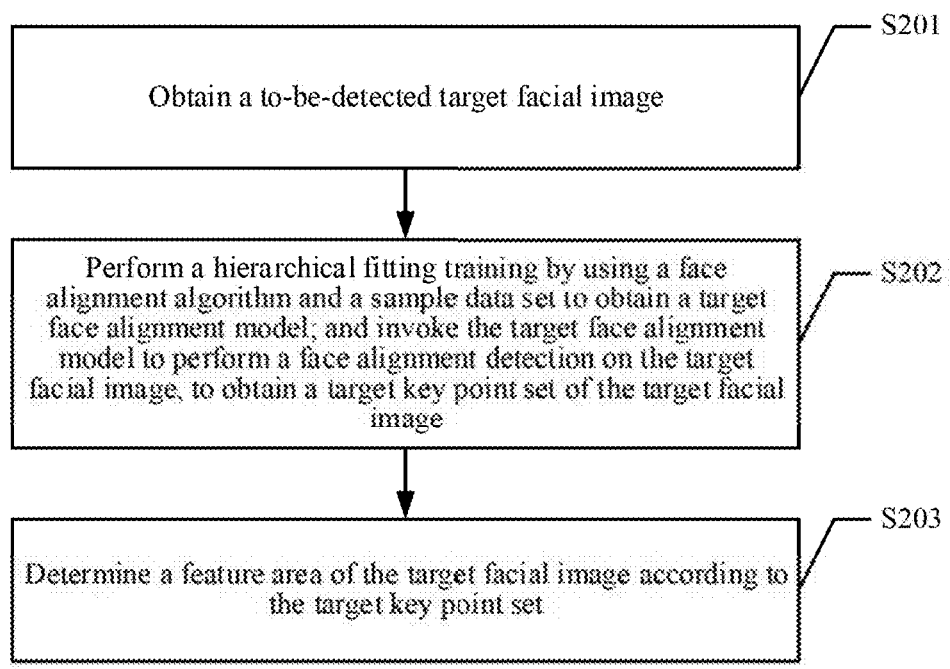
FIG. 2 is a schematic flowchart of a face detection method according to an embodiment of this application.

Based on the above descriptions, an embodiment of this application provides a face detection method that can be implemented by a terminal device, for example, a mobile terminal such as a smartphone or a tablet computer. As shown in FIG. 2, the method may include the following steps S201 to S203.

In step S201, the method can obtain a to-be-detected target facial image. The target facial image may be a facial image obtained by a terminal invoking a camera apparatus (for example, a camera) to take an environmental image in real time, or a stored facial image obtained by a terminal from a local gallery or a cloud photo album. The cloud photo album herein is a web album based on a cloud computing platform. In an embodiment, if the terminal detects a triggering event of the face alignment detection, the to-be-detected target facial image may be obtained. The triggering event of the face alignment detection herein may be used as a service request.

In particular, in a case that it is detected that a user is using an application program based on the face alignment detection, a service request requiring the face alignment detection is monitored; and in a case that the service request is detected, a camera apparatus of the terminal device is invoked to obtain a facial image of a requester as the target facial image.

The application programs based on the face alignment detection may include, but are not limited to, a facial expression recognition application program, a face changing effect application program, and a smart mapping application program. When the user uses the application programs, the terminal needs to obtain the target facial image, and perform the face alignment detection on the target facial image to determine feature areas. Therefore, operations such as facial expression recognition, face changing effect, and smart mapping are performed based on the feature areas.

Optionally, the triggering event of the face alignment detection may be alternatively an event that it is detected that the terminal performs identity verification according to the target facial image. When the terminal performs the identity verification according to the target facial image, the face alignment detection first needs to be performed on the target facial image to determine the feature areas. Therefore, operations such as information matching are performed based on the determined feature areas and preset facial information.

In another embodiment, if the terminal detects that the user sends an instruction of performing the face alignment detection, the to-be-detected target facial image may be obtained. The instruction may be a speech instruction, a press/click instruction, an instruction of enabling face alignment detection function or the like.

In step S202, the method can perform a hierarchical fitting training by using a face alignment algorithm and a sample data set to obtain a target face alignment model, and invoke the target face alignment model to perform a face alignment detection on the target facial image, to obtain a target key point set of the target facial image. After the terminal obtains the to-be-detected target facial image, the target facial image may be inputted into the target face alignment model, so that the target face alignment model may perform the face alignment detection on the target facial image, thereby obtaining the target key point set of the target facial image.

The target key point set herein may include a plurality of target key points and label information of the target key points. The target key points may be any one of the following: mouth key points, eyebrow key points, eye key points, nose key points, ear key points, and the like. The label information of the target key points may include position information, shape information, feature information, and the like of the target key points.

The target face alignment model is obtained by using the face alignment algorithm and the sample data set to perform the hierarchical fitting training. The face alignment algorithm herein may include, but is not limited to, a machine learning regression algorithm such as a supervised descent method (SDM) algorithm and a local binary features (LBF) algorithm or a convolutional neural network (CNN) algorithm such as a facial landmark detection by deep multi-task learning (TCDCN) algorithm and a 3D dense face alignment (3DDFA) algorithm. Based on the algorithms, an original model may be designed. A training is then performed based on the original model and the sample data set, so that the target face alignment model may be eventually obtained.

In an embodiment, before the obtaining a to-be-detected target facial image, the method can further include obtaining the sample data set, the sample data set including a plurality of sample facial images and reference key point sets of the sample facial images, the reference key point set of each sample facial image including a plurality of reference key points and label information of the reference key points. Further, the method can include determining a plurality of feature areas used for representing the sample facial images according to the plurality of reference key points and the label information of the reference key points.

The feature areas include any one of the following: the eyebrow area, the eye area, the nose area, the mouth area, and the ear area. The face alignment algorithm includes a machine learning regression algorithm or a CNN algorithm.

The hierarchical fitting training is determining training priorities of the feature areas of the sample facial images according to loss weights of the feature areas, and performing a fitting training on the feature areas of the sample facial images by using the face alignment algorithm and according to the training priorities. Specifically, detection difficulties of the feature areas are different. Different loss weights are set for the feature areas according to the detection difficulties of the feature areas. The feature area with a larger loss weight has a higher priority during training. According to the training priority, the fitting training is performed on the feature areas by using the face alignment algorithm.

In an embodiment, a difficult sample facial image is selected from the sample data set; an iterative training is performed according to the face alignment algorithm and the sample data set; and a result of the iterative training is optimized according to the difficult sample facial image to obtain the target face alignment model. The difficult sample facial image is a sample facial image that is selected from the sample data set and has a relatively high detection difficulty.

The feature area in which the key points have a higher detection difficulty has a larger loss weight. When the loss weight is larger, the impact on the value of the loss function is larger, and the value of the loss function may be used for describing loss values of the face alignment model under different model parameters.

In the training process, the model parameters may be continuously changed to reduce the value of the loss function, thereby achieving the objective of model training and optimization. When the value of the loss function meets a preset condition, it indicates that the training is completed. In this case, an obtained face alignment model is the target face alignment model. The preset condition herein may include, but is not limited to, that the value of the loss function is within a preset value range or the value of the loss function is the smallest value.

Therefore, in the training process, in order to avoid the impact of the loss weight on the value of the loss function, it is more likely to perform the fitting training on a feature area with a larger loss weight. Therefore, the target face alignment model obtained by training may accurately perform a key point detection on the feature area with a larger loss weight, which is the feature area in which the key point has a detection difficulty. It can be learned that the target face alignment model obtained through the hierarchical fitting training has relatively high accuracy.

In step S203, the method can determine a feature area of the target facial image according to the target key point set. After the target key point set is obtained, the feature area of the target facial image is determined according to label information of the target key points in the target key point set. It can be learned from the above that the label information may include feature information, position information, and the like.

In an embodiment, the feature area may be determined according to the feature information of the target key points. Specifically, categories of the target key points are determined according to the feature information of the target key points. An area formed by the target key points in the same category is used as a feature area, and the category is used as the category of the feature area. For example, target key points whose feature information is all feature information of the nose are selected, categories of the target key points are all nose key points. An area formed by the target key points is used as a nose area.

In another embodiment, the feature area may be determined according to the position information of the target key points. Specifically, label positions of the target key points may be first determined according to the position information, and target key points in adjacent positions are connected. If a shape obtained by connection is similar to the shape of any one of the facial features (the eyebrows, eyes, nose, mouth, and ears), an area formed by the target key points in the adjacent positions is determined as a feature area, and the category of the feature area is determined according to the shape. For example, if the shape obtained by connecting the target key points in adjacent positions is similar to the shape of nose, an area formed by the target key points in adjacent positions is determined as a nose area.

In this embodiment of this application, a face alignment detection is performed by using a target face alignment model. Because the target face alignment model is obtained by using a hierarchical fitting training, the target face alignment model may accurately perform a key point detection on feature areas, thereby improving the accuracy of a detection result. The target face alignment model has relatively small memory and a fast running speed, thereby improving the efficiency of the face alignment detection.

Figure 3:
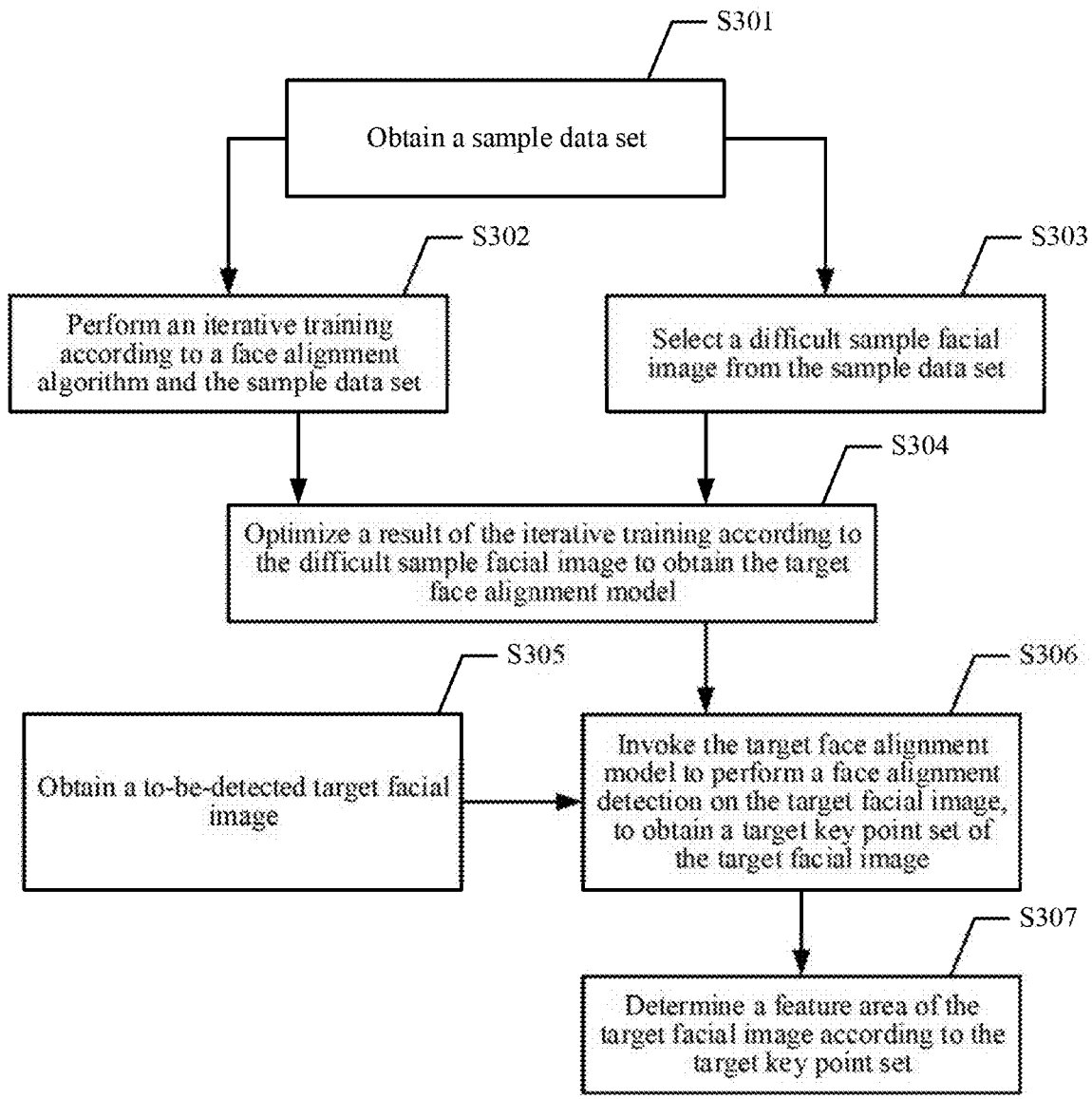
FIG. 3 is a schematic flowchart of a face detection method according to another embodiment of this application.

As shown in FIG. 3, another embodiment of this application provides a face detection method, implemented by a terminal device, for example, a mobile terminal such as a smartphone or a tablet computer. Based on the embodiment shown in FIG. 2, the embodiment includes specific steps of the hierarchical fitting training. As shown in FIG. 3, the method may include following steps S301 to S307.

In step S301, the method can obtain a sample data set. The sample data set herein may include a plurality of sample facial images and reference key point sets of the sample facial images. The reference key point set of each sample facial image includes a plurality of reference key points and label information of the reference key points. The plurality of reference key points and the label information of the reference key points may be used for representing a plurality of feature areas of the facial images. The feature areas may include any one of the following: an eyebrow area, an eye area, a nose area, a mouth area, and an ear area. In an embodiment, the plurality of key points in the reference key point set and the label information of the key points may be obtained by performing a pre-labeling on the sample facial images by a professional labeling worker.

In step S302, the method can perform an iterative training according to a face alignment algorithm and the sample data set. A specific process of the iterative training may include the following steps S3021 and S3022.

In step S3021, the method can perform a pre-processing on the sample data set to obtain a plurality of training data sets, each training data set including a plurality of pre-processed sample facial images. The terminal may perform the pre-processing on the sample data set by using different augmentation parameters. The pre-processing may include an augmentation and a normalization, thereby obtaining the plurality of training data sets. The plurality of training data sets may include a first training data set. The first training data set may be any one of the plurality of training data sets. Correspondingly, specific implementations of performing a pre-processing on the sample data set to obtain a plurality of training data sets may be obtaining a first augmentation parameter, and performing an augmentation on the sample data set according to the first augmentation parameter to obtain a first augmented data set. The obtained first augmented data set may include a plurality of augmented sample facial images.

The augmentation herein includes at least one of the following: a displacement, a rotation, a mirroring, and a compression. A corresponding augmentation parameter includes at least one of the following: a displacement parameter, a rotation angle parameter, and a compression ratio parameter.

The displacement is changing the position of a facial part in the sample facial image. Specifically, a formula shown in Formula 1.1 may be used to perform the displacement on the sample facial image:

$$Rect(x,y,w,h) \rightarrow Rect(x+dx,y+dy,w,h) \qquad \text{Formula 1.1,}$$

where Rect is used for storing parameters that appear in pairs, Rect(x, y, w, h) represents initial coordinates of the sample facial image, x is a horizontal coordinate, y is a vertical coordinate, w is a width value of the sample facial image, and h is a length value of the sample facial image. Further, Rect(x+dx, y+dy, w, h) represents the coordinates of the sample facial image after the displacement, dx is a variation of the horizontal coordinate, dy is a variation of the vertical coordinate, and both dx and dy may be used as displacement parameters.

Figure 4A:
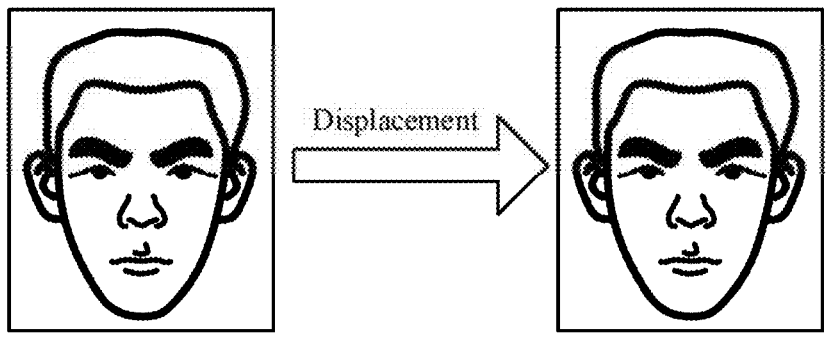
FIG. 4a is a schematic diagram of a displacement according to an embodiment of this application.

The initial coordinates of the sample facial image may be coordinates in the upper left corner of the sample facial image, or coordinates in the upper right corner of the sample facial image, or the coordinates of the center point of the sample facial image, which is not limited herein. For example, the initial coordinates of the sample facial image are the coordinates of the center point of the sample facial image. For a schematic diagram of the displacement, reference may be made to FIG. 4a.

Figure 4B:
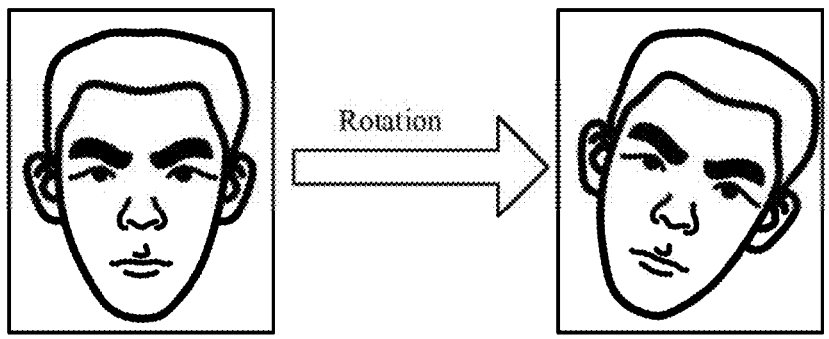
FIG. 4b is a schematic diagram of a rotation according to an embodiment of this application.

The rotation is rotating the sample facial image clockwise ($\theta$ is positive) or counterclockwise ($\theta$ is negative) by a rotation angle $\theta$ with the center point of the sample facial image as the origin. $\theta$ may be used as a rotation angle parameter. Specifically, it is assumed that the coordinates of the center point of the sample facial image are (x,y), for any pixel $(x_0, y_0)$ in the sample facial image, a rotation transformation matrix shown in Formula 1.2 may be used to perform the rotation to obtain rotated pixel coordinates (x', y'), where $x+=(x-x_0)\cos\theta+(y-y_0(-\sin\theta)+x_0$ and $y'=(x-x_0)\sin\theta+(y-y_0)\cos\theta+y_0$. For a schematic diagram of the rotation, reference may be made to FIG. 4b:

$$A = \begin{bmatrix} \cos\theta & -\sin\theta \\ \sin\theta & \cos\theta \end{bmatrix}. \qquad \text{Formula 1.2}$$

Figure 4C:
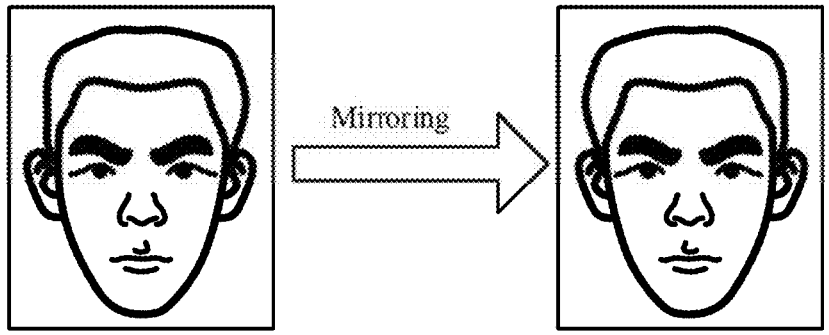
FIG. 4c is a schematic diagram of a mirroring according to an embodiment of this application.

The mirroring may include a horizontal mirroring and a vertical mirroring. The horizontal mirroring is switching the left part and the right part of the sample facial image with the vertical central axis of the sample facial image as the center. The vertical mirroring is switching the upper part and the lower part of the sample facial image with the horizontal central axis of the sample facial image as the center. For example, in this embodiment of this application, the horizontal mirroring is performed on the sample facial image. Specifically, for any pixel $(x_0, y_0)$ in the sample facial image, a formula shown in Formula 1.3 may be used to perform the horizontal mirroring. The coordinates of the pixel obtained after the horizontal mirroring are $(x_1, y_1)$. Further, w in Formula 1.3 is the width value of the sample facial image. For a schematic diagram of the horizontal mirroring, reference may be made to FIG. 4c:

$$[x_0 \; y_0 \; 1] = [x_1 \; y_1 \; 1] \begin{bmatrix} -1 & 0 & 0 \\ 0 & 1 & 0 \\ w & 0 & 1 \end{bmatrix}. \qquad \text{Formula 1.3}$$

In other embodiments, when the mirroring is performed on the sample facial image, the vertical mirroring may be performed on the sample facial image, or both the horizontal mirroring and the vertical mirroring may be performed on the sample facial image.

Figure 4D:
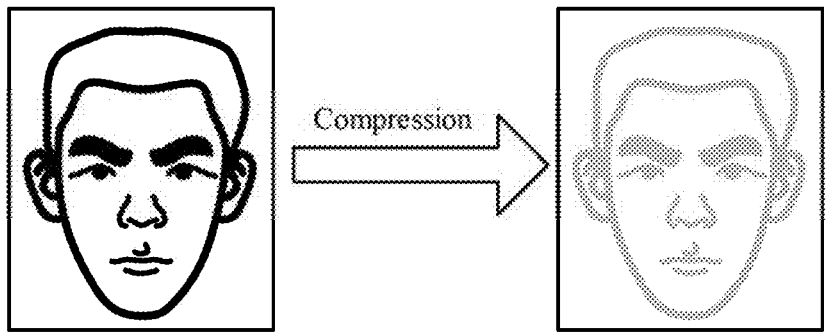
FIG. 4d is a schematic diagram of a compression according to an embodiment of this application.

The compression is saving the sample facial image according to a specified image quality parameter in the process of saving the sample facial image in an image format. The specified quality parameter may be determined from a preset quality parameter range, and the preset quality parameter range may be [0, 100%]. When the image quality parameter is higher, the definition of the saved sample facial image is higher. The image quality parameter herein may be used as a compression ratio parameter. For example, the image quality parameter is 85%. For example, for a schematic diagram of performing the compression on the sample facial image, reference may be made to FIG. 4d.

Second, after the first augmented data set is obtained, the sample data set and the first augmented data set may combined to obtain a combined data set. The plurality of augmented sample facial images in the first augmented data set may be the sample facial images obtained by sequentially performing the displacement, the rotation, the mirroring, and the compression on the sample facial images in the sample data set.

In other embodiments, the plurality of augmented sample facial images in the first augmented data set may be alternatively the sample facial images obtained by performing part of the foregoing augmentation on the sample facial images in the sample data set, for example, sample facial images obtained after performing only the displacement, sample facial images obtained after performing only the rotation or sample facial images obtained after performing only the displacement and the compression.

Finally, the normalization may be performed on the combined data set to obtain the first training data set. The normalization includes an image normalization and/or a label information normalization. The image normalization is a normalization of performing a rotation floating point decentralization on the sample facial images. Specifically, a data type of the sample facial image needs to be transformed first, and the data type is transformed into a floating point type, so as to perform the normalization on the sample facial image. Because an image is usually composed of a plurality of image channels, for example, a JPG image is usually composed of three image channels Red Green Blue (RGB). Therefore, when the normalization is performed on the sample facial image, for any image channel CO of the sample facial image, an average value m and variance d of all pixel values of the image channel may be calculated. The normalization is then performed on a value $CO_i$ of a pixel i of the image channel by using a formula shown in Formula 1.4 to obtain a new image channel $C_i$:

$$C_i=(CO_i-m)/d \qquad \text{Formula 1.4.}$$

The normalization is performed on the sample facial image, so that pixel values in the normalized sample facial image may be within a preset interval, thereby improving the stability of the sample facial image and the accuracy of the subsequent model training. The preset interval may be determined according to an actual service requirement, and is, for example, [0, 1].

The normalization of the label information is performing the normalization on position information in the label information of the reference key points in the sample facial image. Specifically, the formula shown in Formula 1.5 may be used to perform the normalization on the position information (coordinates) of the reference key points:

$$(x,y) \rightarrow (x/w, y/h) \qquad \text{Formula 1.5,}$$

where (x, y) (x, y) represents the coordinates of any one of the reference key point in the sample facial image, w is the width value of the sample facial image, and h is the length value of the sample facial image. After performing the normalization of the label information on the sample facial image, the accuracy of the subsequent model training may be improved.

In step S3022, the method perform the iterative training by using the face alignment algorithm and the plurality of training data sets to obtain a first face alignment model. The plurality of training data sets obtained in step s11 may be generally referred to as a first training data set, or the plurality of training data sets may further be divided into a second training data set and a third training data set. During the iterative training, the second training data set is chosen over the third training data set. An augmentation parameter corresponding to the second training data set is greater than an augmentation parameter corresponding to the third training data set. For example, the augmentation parameter corresponding to the second training data set may be: displacement parameters dx=20 and dy=20; and a rotation angle parameter θ=40°; and the augmented parameter corresponding to the third training data set may be: displacement parameters dx=5 and dy=5; and a rotation angle parameter θ=10°.

Correspondingly, the specific implementation of performing the iterative training by using the face alignment algorithm and the plurality of training data sets to obtain the first face alignment model may be performing training by using the face alignment algorithm and the first training data set to obtain an initial face alignment model. The face alignment algorithm may include, but is not limited to, a machine learning regression algorithm or a CNN algorithm.

Specifically, an original model may be constructed by using the face alignment algorithm. A training optimization is performed on the original model by using the first training data set to obtain the initial face alignment model, so that the training optimization is further performed on the initial face alignment model based on the second training data set, the third training data set, and even more training data sets. Different augmentation parameters are used for different training data sets.

The training optimization of the original model may be implemented by using a supervised machine learning optimization algorithm. That is, the known reference key points in the sample facial images based on the first training data set are compared with detection key points that are detected by the original model to obtain position differences. If the difference is large, it is more necessary to adjust the model parameter of the original model until the difference between the detected key point and the reference key point is minimized or the difference is less than the preset threshold. In this case, the initial face alignment model is obtained.

Next, a loss function of the initial face alignment model is set according to a hierarchical fitting rule. The hierarchical fitting rule may be a rule that is set based on at least one feature area and the loss weight of the feature area. The loss weight is positively correlated to a fitting training order, and a fitting training is preferentially performed on the feature area with a larger loss weight.

Practice has shown that when the face alignment detection is performed on the facial image, average errors of the mouth key points of the mouth area are usually large. That is, it is more difficult to detect the mouth area, and the accuracy thereof is low. Therefore, during the model training, a fitting training may be preferentially performed on feature areas with high detection difficulties, for example, the mouth area. Therefore, the target face alignment model may accurately perform the key point detection on the feature areas with high detection difficulties.

Figure 5:
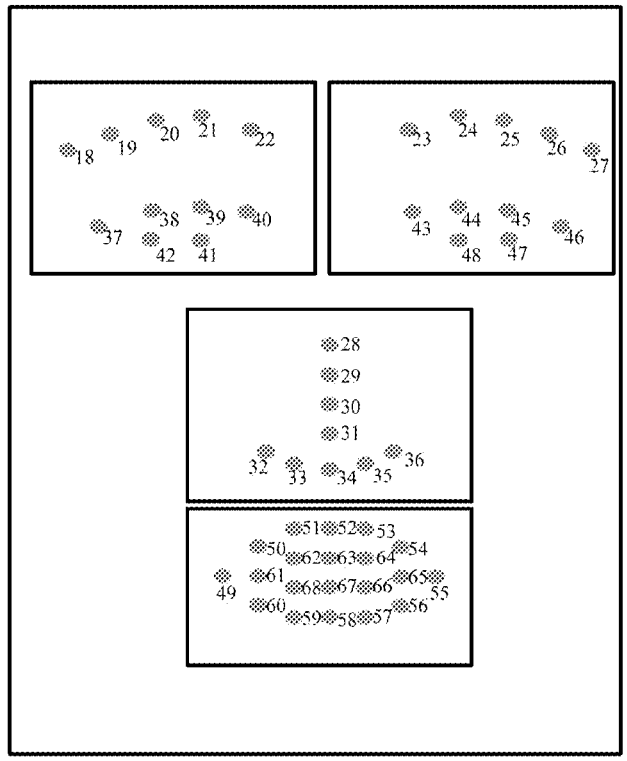
FIG. 5 is a schematic diagram of a division of a face area according to an embodiment of this application.

Based on this, the plurality of feature areas used for representing the sample facial images may be determined according to the plurality of reference key points and the label information of the reference key points in the sample facial image. For example, a quantity of the reference key points is 51. A schematic diagram of a division of an area may be shown as FIG. 5. It is to be understood that the quantity of the reference key points is only an example, and is not limited to 51. The quantity may be alternatively 48, 86, or the like.

Different loss weights are set for the feature areas according to the detection difficulties of the feature areas. The feature area with a higher detection difficulty has a larger loss weight. The hierarchical fitting rule is determined according to the set loss weight. The hierarchical fitting rule may represent that the loss weight is positively correlated to a fitting training order, and a fitting training is preferentially performed on the feature area with a larger loss weight.

Finally, a loss function shown in Formula 1.6 may be set according to the hierarchical fitting rule:

$$E=\Sigma_{j=1}^{n}\omega_j[(x_j-x'_j)^2+(y_j-y'_j)^2] \qquad \text{Formula 1.6,}$$

where $x_j$ and $y_j$ respectively represent label coordinates of the reference key points, and $y'_j$ and $x'_j$ respectively represent label coordinates of the detection key points; and $\omega_j$ represents the loss weight of the reference key points, and the value may be determined according to the loss weight of the feature area to which the reference key point belongs. For example, if the loss weight of the mouth area in the hierarchical fitting rule is 0.6, the loss weights of the mouth key points of all the mouth areas are 0.6.

Finally, the second training data set and the third training data set are sequentially chosen to perform the training on the initial face alignment model according to a principle of reducing the value of the loss function to obtain the first face alignment model. In a specific implementation, the second training data set may be first chosen to perform the training on the initial face alignment model according to the principle of reducing the value of the loss function to obtain the intermediate face alignment model.

Specifically, when the training is performed based on a target sample facial image in the second training data set, after the face key point detection is performed on the target sample facial image through the initial face alignment model this time, the value of a loss function is obtained based on the foregoing Formula 1.6. At this moment, the model parameter of the initial face alignment model is adjusted to make the value of a new obtained loss function become smaller after the face key point detection is performed on the target sample facial image next time. Therefore, the face key point detection, the calculation of the value of the loss function, and the adjustment of the model parameter are repeatedly performed on all the sample facial images in the second training data set to obtain the intermediate face alignment model.

The third training data set is then chosen to perform the training on the intermediate face alignment model to obtain the first face alignment model. For a process of performing the training on the intermediate face alignment model to obtain the first face alignment model, reference may be made to the foregoing descriptions of the training process from the initial face alignment model to the intermediate face alignment model.

When the augmentation parameter is larger, the complexity of the sample facial image in the corresponding training data set is higher. Therefore, the second training data set with a larger augmentation parameter is first used for training, so that a trained face alignment model may first adapt to a more complex facial image, and the third training data set with a smaller augmentation parameter is used for training, so that a trained face alignment model may then adapt to a simper facial image. A training process with descending complexity can improve the efficiency of the model training.

In each training process, a fitting training is preferentially performed on key points with relatively large loss weights according to the loss weights of the key points in the loss function. For example, among the plurality of feature areas, the mouth area has the largest loss weight. Therefore, during each training, a fitting training is preferentially performed on the key points of the mouth area.

In other embodiments, the third training data set may be first chosen to perform the training on the initial face alignment model according to a principle of reducing the value of the loss function to obtain the intermediate face alignment model. The second training data set is then chosen to perform the training on the intermediate face alignment model to obtain the first face alignment model.

According to accuracy requirement of the face alignment model, in other embodiments, the iterative training may be performed by using more training data sets. For example, the plurality of training data sets may include a second training data set, a third training data set, a fourth training data set, and a fifth training data set. The iterative training may be performed by using the plurality of training data sets to obtain the first face alignment model. A descending order of augmentation parameters corresponding to the plurality of training data sets is: an augmentation parameter corresponding to the second training data set>an augmentation parameter corresponding to the third training data set>an augmentation parameter corresponding to the fourth training data set>an augmentation parameter corresponding to the fifth training data set.

It is shown in tests that after the training optimization of the model is performed sequentially based on the training data sets obtained by using different augmentation parameters, the eventually obtained target face alignment model can more accurately perform the face key point detection, to achieve higher robustness.

In Step 303, the method can select a difficult sample facial image from the sample data set.

The specific process of selecting includes the following S3031 and S3032. In step S3031, the method can invoke the first face alignment model to perform the face alignment detection on the sample data set, to obtain detection key point sets of the sample facial images in the sample data set. The detection key point set includes a plurality of detection key points and label information of the detection key points.

In step S3032, the method can select the difficult sample facial image from the sample data set according to a difference between the reference key point set and the detection key point set. In a specific implementation, for the each sample facial image, the difference between the reference key point set and the detection key point set may be calculated. A sample facial image whose difference is greater than a preset threshold is selected from the sample data set as the difficult sample facial image.

The preset threshold may be determined according to a service requirement of the target face alignment model that if the accuracy requirement of the target face alignment model is high, the preset threshold may be a relative small value, and if the accuracy requirement of the target face alignment model is low, the preset threshold may be a relative large value.

In an embodiment, the Euclidean distance formula shown in Formula 1.7 may be used to calculate the difference between the reference key point set and the detection key point set of the each sample facial image:

$$d(p, q) = \sqrt{(q_1 - p_1)^2 + (q_2 - p_2)^2 + \cdots + (q_n - p_n)^2} = \sqrt{\sum_{i=1}^{n} (q_i - p_i)^2},$$ Formula 1.7 where $p_i$ represents any reference key point in the sample facial image, $q_i$ represents any detection key point in the sample facial image, $d(p,q)$ represents the difference between the reference key point set and the detection key point set, and $d(p,q)=d(q,p)$.

In another embodiment, the difference between the reference key point set and the detection key point set of the each sample facial image is calculated by using a cosine similarity. Specifically, the coordinates of the reference key points in the reference key point set may be represented by a vector to obtain a reference vector set and the coordinates of the detection key points in the detection key point set may be represented by a vector to obtain a detection vector set. The difference between the reference vector set and the detection vector set is then calculated by using the formula of cosine similarity, thereby determining the difference between the reference key point set and the detection key point set of the each sample facial image.

In another embodiment, the difference between the reference key point set and the detection key point set of the each sample facial image is calculated by using a Manhattan distance, a Hamming distance, and a Chebyshev distance.

In step S304, the method can optimize the first face alignment model by using the difficult sample facial image to obtain the target face alignment model. Specifically, an augmentation, such as a displacement, a rotation, a mirroring, and a compression may be first performed on the difficult sample facial image. A normalization, such as an image normalization and a label information normalization may then be performed on the difficult sample facial image and the augmented difficult sample facial image, to obtain a difficult training data set. Next, the first face alignment model is optimized by using the difficult training data set according to a principle of reducing the value of the loss function to obtain the target face alignment model. That is, after the difficult training data set is obtained, the first face alignment model may further be optimized based on the difficult training data set.

An optimization of the first face alignment model is mainly to optimize the model parameter in the first face alignment model according to the value of the loss function. For the process of optimization based on the value of the loss function, reference may be made to the foregoing Formula 1.6 and other related descriptions. In the process of optimizing the first face alignment model based on the difficult training data set, the model parameter of the first face alignment model may be continuously changed to reduce the value of the loss function of the first face alignment model, to make the value of the loss function of the first face alignment model meet the preset condition, thereby achieving the objective of optimizing the first face alignment model.

The target face alignment model trained by using steps S302 to S304 has a fast running speed and small memory, thereby reducing the difficulty of deployment on a mobile terminal and improving the detection accuracy of the key point.

In step S305, the method can obtain a to-be-detected target facial image.

In step S306, the method can invoke the target face alignment model to perform a face alignment detection on the target facial image, to obtain a target key point set of the target facial image. The target key point set includes a plurality of target key points and label information of the target key points.

In step S307, the method can determine a feature area of the target facial image according to the target key point set.

For steps S305 to S307, reference may be made to steps S201 to S203 in the foregoing embodiments of this application, and details are not described in the embodiments of this application.

In this embodiment of this application, a face alignment detection is performed by using a target face alignment model. Because the target face alignment model is obtained by using a hierarchical fitting training, the target face alignment model may accurately perform a key point detection on feature areas, thereby improving the accuracy of a detection result. The target face alignment model has relatively small memory and a fast running speed, thereby improving the efficiency of the face alignment detection.

Figure 6:
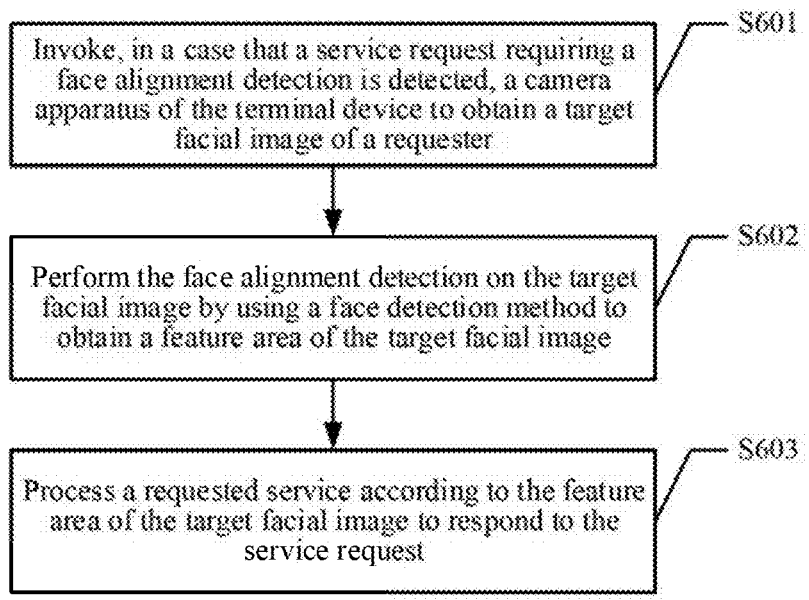
FIG. 6 is a schematic flowchart of a service processing method according to an embodiment of this application.

Based on the above embodiments of the face detection method, an embodiment of this application further provides a service processing method, implemented by a terminal device, for example, a mobile terminal such as a smartphone or a tablet computer. As shown in FIG. 6, the method may include following steps S601 to S603.

In step S601, the method can invoke, in a case that a service request requiring a face alignment detection is detected, a camera apparatus of the terminal device to obtain a target facial image of a requester. The service request may be automatically generated by the terminal. For example, when the terminal detects that a user turns on a face alignment detection function of the terminal, or a user uses an application program based on the face alignment detection, a service request may be automatically generated.

Different application programs may correspond to different service requests. For example, a service request corresponding to a smart mapping application program is a smart mapping request, a service request corresponding to a face recognition application program is an identity verification request, and a service request corresponding to a face changing effect application program is a face changing effect processing request. After the service request is detected, the camera apparatus (for example, a camera) of the terminal is invoked to take a photo of the requester to obtain a target facial image of the requester.

In other embodiments, after the service request is detected, a stored facial image obtained from a local gallery or a cloud photo album is used as the target facial image. Alternatively, when the service request is detected, a facial image displayed on a screen of the terminal is used as the target facial image. After receiving the service request, the terminal analyzes the service request to determine a requested service corresponding to the service request. The requested service may include, but is not limited to, any one or more of a face recognition service, an expression recognition service, an age analysis service, a face changing effect service, and a smart mapping service.

In step S602, the method can perform the face alignment detection on the target facial image by using a face detection method to obtain a feature area of the target facial image. The face detection method may correspond to the face detection method described in the embodiments shown in FIG. 2 or FIG. 3. When the face alignment detection is performed on the target facial image by using the face detection method, the face alignment detection may be performed by using the target face alignment model mentioned in the foregoing embodiments to obtain the feature area such as the mouth area, the eyebrow area, the eye area, the nose area, and the ear area of the target facial image.

In step S603, the method can process the requested service according to the feature area of the target facial image to respond to the service request. After the feature area of the target facial image is determined, the requested service is processed to respond to the service request according to the feature area.

Figure 7:
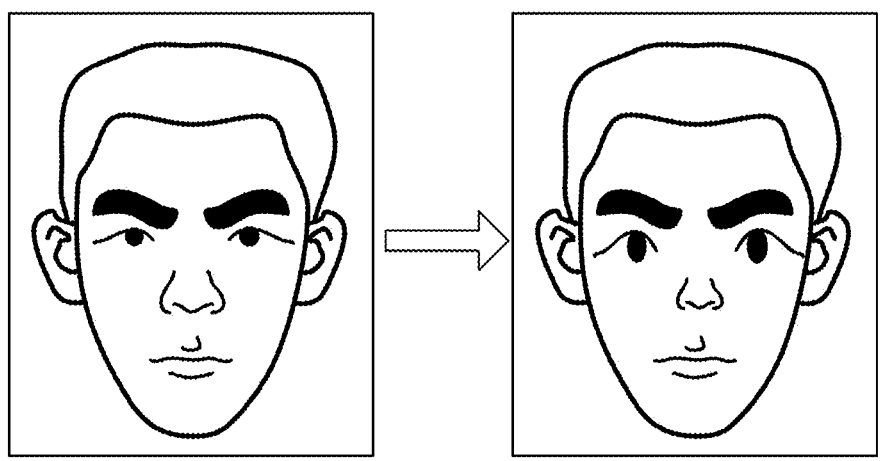
FIG. 7 is a diagram of an application scenario of a service processing method according to an embodiment of this application.

Specifically, if the requested service is the face changing effect service, after the feature area is determined, information such as the position and size of one or more key points in the feature area is transformed to change a facial shape in the target facial image. For example, the face changing effect service is a service of enlarging the eyes and shrinking the nose. Information such as the position and size of a plurality of key points in the eye area may be transformed to enlarge the eye area, and information such as the position and size of a plurality of key points in the nose area may be transformed to shrink the nose area, to complete the face changing effect service, as shown in FIG. 7.

Figure 8:
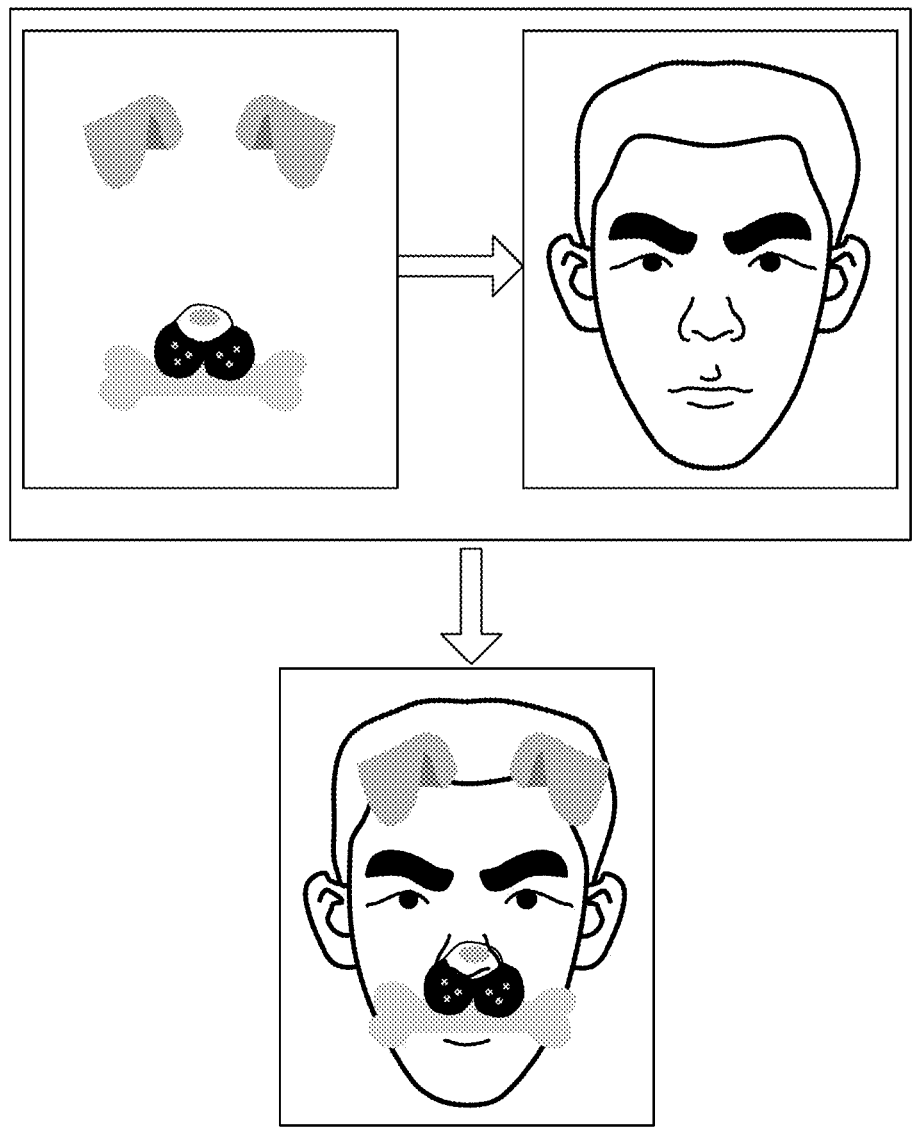
FIG. 8 is a diagram of an application scenario of another service processing method according to an embodiment of this application.

If the requested service is the smart mapping service, after the feature area and a target mapping template are determined, each map in the mapping template is correspondingly added to each feature area to obtain the target facial image processed by the smart mapping. For example, the target mapping template is a mapping template of a dog image. After the feature area is determined, maps such as "dog's ears", "dog's nose", and "dog's mouth" are correspondingly added to the feature areas to complete the smart mapping service, as shown in FIG. 8.

In this embodiment of this application, after a target facial image is obtained, a face alignment detection is performed by using a face detection method to obtain a feature area of the target facial image, and a requested service is processed to respond to the service request according to the feature area. Because a target face alignment model used in the face detection method is obtained by performing a hierarchical fitting training, a key point detection may be accurately performed on feature areas, thereby improving the accuracy of a service processing result.

Figure 9:
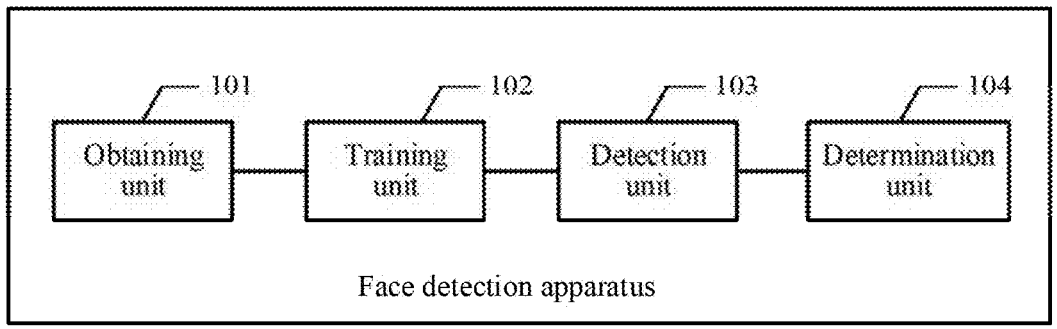
FIG. 9 is a schematic structural diagram of a face detection apparatus according to an embodiment of this application.

Based on the descriptions of the foregoing face detection method, an embodiment of this application further provides a schematic structural diagram of a face detection apparatus shown in FIG. 9. The face detection apparatus may perform the methods shown in FIG. 2 and FIG. 3. Of course, it should be understood that one or more of the units described in this disclosure can be implemented by processing circuitry.

Referring to FIG. 9, the face detection apparatus in an embodiment of this application may include an obtaining unit 101 that is configured to obtain a to-be-detected target facial image, and a training unit 102 that is configured to perform a hierarchical fitting training by using a face alignment algorithm and a sample data set to obtain a target face alignment model. The apparatus can further include a detection unit 103 that is configured to invoke the target face alignment model to perform a face alignment detection on the target facial image, to obtain a target key point set of the target facial image, and a determination unit 104 that is configured to determine a feature area of the target facial image according to the target key point set.

In an embodiment, the obtaining unit 101 may further be configured to obtain the sample data set, the sample data set including a plurality of sample facial images and reference key point sets of the sample facial images, the reference key point set of each sample facial image including a plurality of reference key points and label information of the reference key points. Additionally, the obtaining unit 101 can determine a plurality of feature areas used for representing the sample facial images according to the plurality of reference key points and the label information of the reference key points.

The training unit 102 is specifically configured to determine training priorities of the feature areas of the sample facial images according to loss weights of the feature area, and perform a fitting training on the feature areas of the sample facial images by using the face alignment algorithm and according to the training priorities. In another embodiment, the feature areas include any one of the following: an eyebrow area, an eye area, a nose area, a mouth area, and an ear area, and the face alignment algorithm includes a machine learning regression algorithm or a CNN algorithm.

In another embodiment, the obtaining unit 101 is specifically configured to: monitor, in a case that it is detected that a user is using an application program based on the face alignment detection, a service request requiring the face alignment detection; and invoke, in a case that the service request is detected, a camera apparatus of the terminal device to obtain a facial image of a requester as the target facial image.

In another embodiment, the sample data set includes a plurality of sample facial images, and the training unit 102 is specifically configured to: perform an iterative training according to the face alignment algorithm and the sample data set; select a difficult sample facial image from the sample data set; and optimize a result of the iterative training according to the difficult sample facial image to obtain the target face alignment model.

In another embodiment, the sample data set further includes reference key point sets of the sample facial images, and the training unit 102 is specifically configured to perform a pre-processing on the sample data set to obtain a plurality of training data sets, each training data set including a plurality of pre-processed sample facial images, and perform the iterative training by using the face alignment algorithm and the plurality of training data sets to obtain a first face alignment model. Further, the training unit 102 can invoke the first face alignment model to perform the face alignment detection on the sample data set, to obtain detection key point sets of the sample facial images in the sample data set, select the difficult sample facial image from the sample data set according to a difference between the reference key point set and the detection key point set, and optimize the first face alignment model by using the difficult sample facial image to obtain the target face alignment model.

In another embodiment, the plurality of training data sets include a first training data set, and the first training data set is any one of the plurality of training data sets, and the training unit 102 may be specifically configured to obtain a first augmentation parameter, and perform an augmentation on the sample data set according to the first augmentation parameter to obtain a first augmented data set, the first augmented data set including a plurality of augmented sample facial images, combine the sample data set and the first augmented data set, and perform a normalization on a combined data set to obtain the first training data set.

In another embodiment, the plurality of training data sets include a second training data set and a third training data set, and in a case of the iterative training, the second training data set is chosen over the third training data set. The training unit 102 may be specifically configured to perform a training by using the face alignment algorithm and the first training data set to obtain an initial face alignment model, set a loss function of the initial face alignment model according to a hierarchical fitting rule; and sequentially choose the second training data set and the third training data set to perform the, training on the initial face alignment model according to a principle of reducing the value of the loss function, to obtain the first face alignment model.

In further embodiments, an augmentation parameter corresponding to the second training data set is greater than an augmentation parameter corresponding to the third training data set; and the augmentation parameter includes at least one of the following a displacement parameter, a rotation angle parameter, and a compression ratio parameter.

In other embodiments, the reference key point set of the each sample facial image includes a plurality of reference key points and label information of the reference key points, and the training unit 102 is specifically configured to determine a plurality of feature areas used for representing the sample facial images according to the plurality of reference key points and the label information of the reference key points, set different loss weights for the feature areas according to detection difficulties of the feature areas, and set the hierarchical fitting rule based on at least one feature area and the loss weights of the feature areas, a fitting training being preferentially performed on the feature area with a larger loss weight.

In another embodiment, the training unit 102 is specifically configured to: choose the second training data set to perform the training on the initial face alignment model to obtain an intermediate face alignment model; and choose the third training data set to perform the training on the intermediate face alignment model to obtain the first face alignment model. Further, the training unit 102 is specifically configured to perform an augmentation on the difficult sample facial image; perform a normalization on the difficult sample facial image and the augmented difficult sample facial image to obtain a difficult training data set, and optimize the first face alignment model by using the difficult training data set to obtain the target face alignment model.

In another embodiment, the training unit 102 can be specifically configured to calculate the difference between the reference key point set and the detection key point set for the each sample facial image, and select a sample facial image whose difference is greater than a preset threshold from the sample data set as the difficult sample facial image.

In another embodiment, the target key point set includes a plurality of target key points and label information of the target key points, and the training unit 102 is specifically configured to determine the feature area of the target facial image according to the label information of the target key points.

In another embodiment, the label information includes feature information, and the training unit 102 is specifically configured to determine categories of the target key points according to the feature information of the target key points, use an area formed by the target key points in the same category as a feature area, and use the category as the category of the feature area. Specifically, the label information includes position information, and the training unit 102 is specifically configured to determine label positions of the target key points according to the position information, and connect target key points in adjacent positions, and determine, in a case that a shape obtained by connection is similar to the shape of any one of the facial features, an area formed by the target key points in the adjacent positions as a feature area, and determine the category of the feature area according to the shape.

In this embodiment of this application, a face alignment detection is performed by using a target face alignment model. Because the target face alignment model is obtained by using a hierarchical fitting training, the target face alignment model may accurately perform a key point detection on feature areas, thereby improving the accuracy of a detection result. The target face alignment model has relatively small memory and a fast running speed, thereby improving the efficiency of the face alignment detection.

Figure 10:
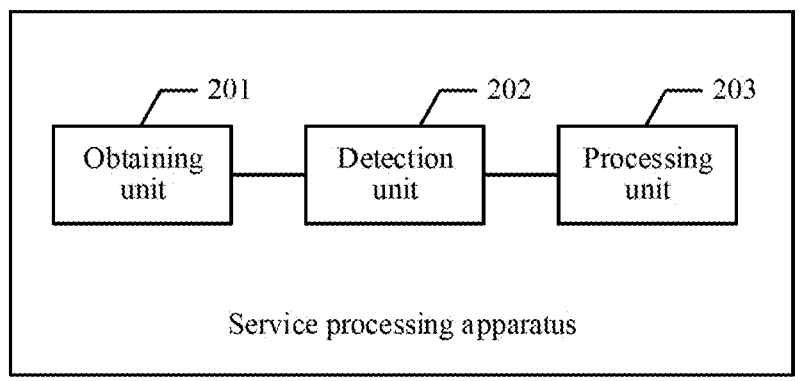
FIG. 10 is a schematic structural diagram of a service processing apparatus according to an embodiment of this application.

Based on the descriptions of the foregoing service processing method, an embodiment of this application further provides a schematic structural diagram of a service processing apparatus shown in FIG. 10. The service processing apparatus may perform the method shown in FIG. 6. Referring to FIG. 10, the service processing apparatus in an embodiment of this application may include an obtaining unit 201 that is configured to invoke, in a case that a service request requiring a face alignment detection is detected, a camera apparatus to obtain a target facial image of a requester, a detection unit 202 that is configured to perform the face alignment detection on the target facial image by using the face detection method shown in FIG. 2 or FIG. 3, to obtain a feature area of the target facial image, and a processing unit 203 that is configured to process a requested service according to the feature area of the target facial image to respond to the service request.

In this embodiment of this application, after a target facial image is obtained, a face alignment detection is performed by using a face detection method to obtain a feature area of the target facial image, and a requested service is processed to respond to the service request according to the feature area. Because a target face alignment model used in the face detection method is obtained by performing a hierarchical fitting training, a key point detection may be accurately performed on feature areas, thereby improving the accuracy of a service processing result.

Figure 11:
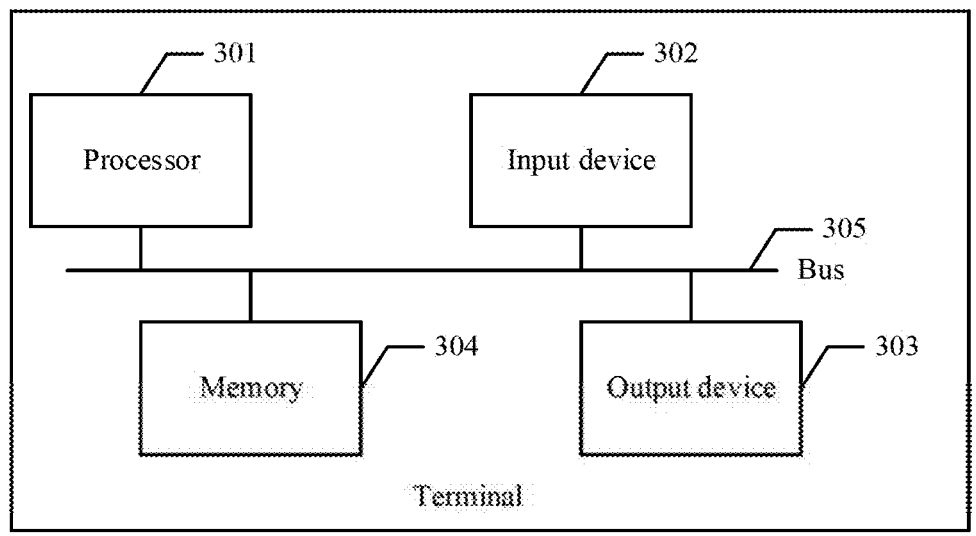
FIG. 11 is a schematic structural diagram of a terminal according to an embodiment of this application.

Based on the descriptions of the foregoing method embodiments and apparatus embodiments, an embodiment of this application further provides a terminal. Referring to FIG. 11, the internal structure of the terminal includes at least a processor 301, an input device 302, an output device 303, and a memory 304. The processor 301, the input device 302, the output device 303, and the memory 304 of the terminal may be connected by a bus or in other manners, for example, by a bus 305 in FIG. 11 in this embodiment of this application. The memory 304 may be configured to store a computer program. The computer program includes a first program instruction and/or a second program instruction. The processor 301 is configured to execute the first program instruction stored in the memory 304 to implement the face detection method shown in FIG. 2 or FIG. 3. In an embodiment, the processor 301 may further be configured to execute the second program instruction stored in the memory 304 to implement the service processing method shown in FIG. 6.

In an embodiment, the processor 301 may be a central processing unit (CPU). The processor may be alternatively another general-purpose processor, that is, a microprocessor or any conventional processor. The memory 304 may include a read-only memory (ROM) and a random access memory (RAM), and provides instructions and data to the processor 301. Therefore, the processor 301 and the memory 304 are not limited herein.

In the embodiments of this application, a non-transitory computer storage medium is further provided, and the computer storage medium is a memory device in the server and is configured to store programs and data. The computer storage medium herein may include an internal storage medium of the terminal and may also include an extended storage medium supported by the terminal. The computer storage medium provides a storage space, storing an operating system of the terminal. In addition, the storage space further stores computer program instructions suitable for being loaded and executed by the processor 301, and the instructions may be one or more computer programs (including program code). The computer storage medium herein may be a high speed RAM or a non-volatile memory, for example, at least one magnetic disk memory. Optionally, the computer storage medium may further be at least one computer storage medium located away from the foregoing processor.

In an embodiment, the processor 301 may load and execute the first computer program instruction stored in the computer storage medium to implement the corresponding steps of the method in the foregoing face detection embodiments. In a specific implementation, the first computer program instruction of the computer storage medium is loaded by the processor 301 to perform the steps of obtaining a to-be-detected target facial image, and performing a hierarchical fitting training by using a face alignment algorithm and a sample data set to obtain a target face alignment model. Further, the processor 301 can include invoking the target face alignment model to perform a face alignment detection on the target facial image, to obtain a target key point set of the target facial image, and determining a feature area of the target facial image according to the target key point set.

In another embodiment, the processor 301 may load and execute the second computer program instruction stored in the computer storage medium to implement the corresponding steps of the method in the foregoing service processing embodiment. In a specific implementation, the second computer program instruction of the computer storage medium is loaded by the processor 301 to perform the steps of invoking, in a case that a service request requiring a face alignment detection is detected, a camera apparatus to obtain a target facial image of a requester, performing the face alignment detection on the target facial image by using the face detection method in FIG. 2 or FIG. 3, to obtain a feature area of the target facial image, and processing a requested service according to the feature area of the target facial image to respond to the service request.

Figure 12:
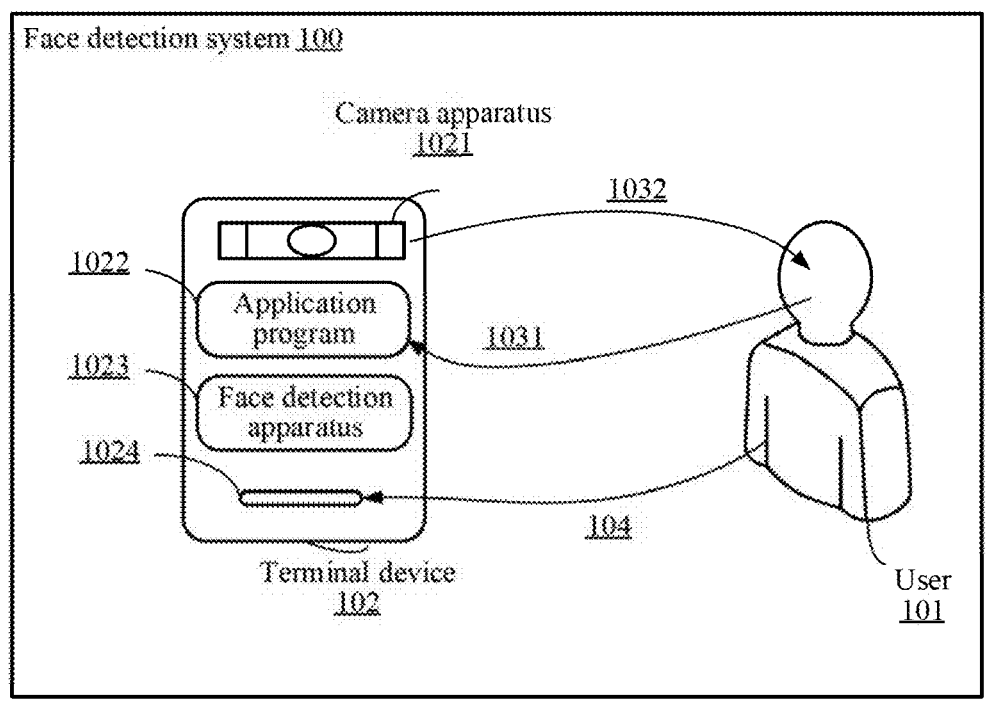
FIG. 12 is a schematic structural diagram of an implementation environment according to an embodiment of this application.

FIG. 12 is a schematic structural diagram of an implementation environment according to an embodiment of this application. As shown in FIG. 12, a face detection system 100 includes a user 101 and a terminal device 102. The terminal device 102 includes a camera apparatus 1021, an application program 1022, a face detection apparatus 1023, and an operation button 1024. The application program 1022 has a requirement of a face alignment detection, and is, for example, a facial expression recognition application program, a face changing effect application program, a smart mapping application program or an identity verification application program.

According to this embodiment of this application, when the terminal device 102 detects that the user 101 is using the application program 1022 based on the face alignment detection, as shown by an arrow 1031, whether the user 101 sends a service request that requires the face alignment detection. When the service request is detected, the terminal device 102 invokes the camera apparatus 1021 to obtain a facial image of a requester, for example, the user 101, or any user other than the user 101 as the target facial image, as shown by an arrow 1032.

The face detection apparatus performs a hierarchical fitting training by using the face alignment algorithm and a sample data set, to obtain the target face alignment model; and invokes the target face alignment model to perform the face alignment detection on the target facial image, to obtain a target key point set of the target facial image, and determines a feature area of the target facial image according to the target key point set, for example, the feature areas shown in FIG. 1b.

In this embodiment of this application, after a target facial image is obtained, a face alignment detection is performed by using a face detection method to obtain a feature area of the target facial image, and a requested service is processed to respond to the service request according to the feature area. Because a target face alignment model used in the face detection method is obtained by performing a hierarchical fitting training, a key point detection may be accurately performed on feature areas, thereby improving the accuracy of a service processing result.

For a specific working process of the terminal and units described above, reference may be made to the related descriptions in the foregoing embodiments, and details are not described herein again.

Of course, a person of ordinary skill in the art may understand that all or some of the processes of the methods in the foregoing embodiments may be implemented by a computer program instructing relevant hardware. The program may be stored in a non-transitory computer-readable storage medium. When the program is executed, the processes of the foregoing method embodiments are performed. The storage medium may be a magnetic disk, an optical disc, a ROM, a RAM, or the like.

The foregoing descriptions are merely some exemplary embodiments of this disclosure, and are not intended to limit the scope of this application. A person skilled in the art may understand all or some processes of the foregoing embodiments, and equivalent modifications made according to the claims of this application shall still fall within the scope of the present disclosure.

What is claimed is:

1. A face detection method that is performed by a terminal device, the face detection method comprising:
obtaining a to-be-detected target facial image;
performing a hierarchical fining training, by using a face-alignment algorithm and a sample data set that includes a plurality of sample facial images, to obtain a target face-alignment model;
performing a face-alignment detection on the target facial image based on the target face-alignment model to obtain a target key point set of the target facial image; and
determining a feature area of the target facial image according to the obtained target key point set,
wherein the performing the hierarchical fitting training further includes
determining training priorities of feature areas of the sample facial images according to loss weights of the feature areas; and
performing a fitting training on the feature areas of the sample facial images by using the face-alignment algorithm, and based on the determined training priorities.

2. The method according to claim 1, further comprising, before the obtaining:
obtaining the sample data set, which includes the plurality of sample facial images and corresponding reference key point sets of the sample facial images, each reference key point set of each sample facial image including a plurality of reference key points and label information of the reference key points; and
determining the plurality of feature areas used to represent the sample facial images according to the plurality of reference key points and the label information of the reference key points.

3. The method according to claim 2, wherein the feature area includes one of an eyebrow area, an eye area, a nose area, a mouth area, and an ear area, and the face-alignment algorithm includes a machine learning regression algorithm or a convolutional neural network (CNN) algorithm.

4. The method according to claim 1, wherein the obtaining further comprises:
monitoring a service request requiring the face-alignment detection when a user is using an application program based on the face-alignment detection; and
invoking a camera apparatus of the terminal device to obtain a facial image of a requester as the target facial image when the service request is detected.

5. The method according to claim 2, wherein the sample data set includes the plurality of sample facial images, and the performing the hierarchical fitting training further comprises:
  performing an iterative training according to the face alignment algorithm and the sample data set;
  selecting a particular sample facial image from the sample data set; and
  optimizing a result of the iterative training according to the particular sample facial image to obtain the target face alignment model.

6. The method according to claim 5, wherein:
  the performing an iterative training according to the face alignment algorithm and the sample data set further comprises:
    performing a pre-processing on the sample data set to obtain a plurality of training data sets that include a plurality of pre-processed sample facial images, and
    performing the iterative training by using the face-alignment algorithm and the obtained plurality of training data sets to obtain a first face alignment model;
  the sample data set further includes reference key point sets of the sample facial images, and the selecting a particular sample facial image from the sample data set further comprises:
    invoking the first face-alignment, model to perform the face-alignment detection on the sample data set to obtain detection key point sets of the sample facial images in the sample data set, and
    selecting the particular sample facial image from the sample data set according to a difference between the reference key point set and the detection key point set; and
  the optimizing a result of the iterative training according to the particular sample facial image to obtain the target face alignment model further comprises optimizing the first face-alignment model by using the particular sample facial image to obtain the target face alignment model.

7. The method according to claim 6, wherein:
  the plurality of training data sets include a first training data set that is one of the plurality of training data sets; and
  the performing the pre-processing on the sample data set to obtain the plurality of training data sets further comprises:
    obtaining a first augmentation parameter and performing an augmentation on the sample data set according to the first augmentation parameter to obtain a first augmented data set, the first augmented data set including a plurality of augmented sample facial images;
    combining the sample data set and the first augmented data set; and
    performing a normalization on a combined data set to obtain the first training data set.

8. The method according to claim 7, wherein:
  the plurality of training data sets includes a second training data set and a third training data set, and when performing the iterative training, the second training data set is chosen over the third training data set, and
  the performing the iterative training by using the face-alignment algorithm and the plurality of training data sets to obtain a first face-alignment model comprises:
    performing a training by using the face-alignment algorithm and the first training data set to obtain an initial face-alignment model;
    setting a loss function of the initial face-alignment model according to a hierarchical fitting rule; and
    sequentially choosing the second training data set and the third training data set to perform the training on the initial face-alignment model according to a principle of reducing a value of the loss function to obtain the first face-alignment model.

9. The method according to claim 8, wherein:
an augmentation parameter corresponding to the second training data set is greater than an augmentation parameter corresponding to the third training data set; and
each augmentation parameter includes at least one of a displacement parameter, a rotation angle parameter, and a compression ratio parameter.

10. The method according to claim 8, wherein:
the reference key point set of each sample facial image includes the plurality of reference key points and the label information of the reference key points, and
the method further comprises:
  determining the plurality of feature areas used to represent the sample facial images according to the plurality of reference key points and the label information of the reference key points;
  setting different loss weights for the feature areas according to detection difficulties of the feature areas; and
  setting the hierarchical fitting rule based on at least one feature area and the loss weights of the feature areas; a fitting training being preferentially performed on a particular feature area with a larger loss weight.

11. The method according to claim 8, wherein the sequentially choosing the second training data set and the third training data set to perform the training on the initial face-alignment model according to the principle of reducing the value of the loss function to obtain the first face-alignment model further comprises:
  choosing the second training data set to perform the training on the initial face-alignment model to obtain an intermediate face alignment model; and
  choosing the third training data set to perform the training on the intermediate face-alignment model to obtain the first face-alignment model.

12. The method according to claim 6, wherein the optimizing the first face-alignment model by using the particular sample facial image to obtain the target face-alignment model further comprises:
  performing an augmentation on the particular sample facial image;
  performing a normalization on the particular sample facial image and the augmented particular sample facial image to obtain a particular training data set; and
  optimizing the first face-alignment model by using the particular training data set to obtain the target face-alignment model.

13. The method according to claim 6, wherein the selecting the particular sample facial image from the sample data set according to the difference between the reference key point set and the detection key point set further comprises:
  calculating the difference between the reference key point set and the detection key point set for each sample facial image; and
  selecting a sample facial image whose difference is greater than a preset threshold from the sample data set as the particular sample facial image.

14. The method according to claim 1, wherein:
the target key point set includes a plurality of target key points and label information of the target key points, and
the determining the feature area of the target facial image according to the target key point set comprises determining the feature area of the target facial image according to the label information of the target key points.

15. The method according to claim 14, wherein:
the label information includes feature information, and
the determining the feature area of the target facial image according to the label information of the target key points comprises determining categories of the target key points based on the feature information of the target key points, using an area formed by the target key points in a same category as the feature area, and using the category as a category of the feature area.

16. The method according to claim 14, wherein:
the label information includes position information; and
the determining the feature area of the target facial image according to the label information of the target key points further comprises:
  determining label positions of the target key points according to the position information, and connecting target key points in adjacent positions; and
  determining an area formed by the target key points in the adjacent positions as the feature area when a particular shape obtained by connection is similar to a shape of one of the facial features, and determining a category of the feature area according to the particular shape.

17. A service processing method that is performed by a terminal device, the method comprising:
  invoking a camera apparatus of the terminal device to obtain the target facial image, which is an image of a requester, when a service request requiring a face alignment detection is detected;
  performing the face-alignment detection on the target facial image by using the face detection method according to claim 1 to obtain the feature area of the target facial image; and
  processing a requested service according to the feature area of the target facial image to respond to the service request.

18. A face detection apparatus, comprising:
processing circuitry configured to:
  obtain a to-be-detected target facial image;
  perform a hierarchical fitting training, by using a face-alignment algorithm and a sample data set, to obtain a target face alignment model;
  invoke the target face-alignment model to perform a face-alignment detection on the target facial image to obtain a target key point set of the target facial image; and
  determine a feature area of the target facial image according to the obtained target key point set,
wherein the processing circuitry is further configured to, in performing the hierarchical fitting training:
  determine training priorities of feature areas of the sample facial images according to loss weights of the feature areas; and
  perform a fitting training on the feature areas of the sample facial images by using the face-alignment algorithm and based on the determined training priorities.

19. A terminal device, comprising a processor, an input device, an output device, and a non-transitory memory, where the processor, the input device, the output device, and the memory are connected to each other, the memory being configured to store a computer program including a first program instruction that, when executed by the processor, causes the processor to perform the face detection method according to claim 1.

* * * * *